United States Patent
Traneus

(10) Patent No.: US 12,472,378 B2
(45) Date of Patent: Nov. 18, 2025

(54) METHOD, COMPUTER PROGRAM PRODUCT AND COMPUTER SYSTEM FOR RADIOTHERAPY PLANNING, AND RADIOTHERAPY DELIVERY SYSTEM

(71) Applicant: RaySearch Laboratories AB (Publ), Stockholm (SE)

(72) Inventor: Erik Traneus, Uppsala (SE)

(73) Assignee: Raysearch Laboratories AB (publ), Stockholm (SE)

( * ) Notice: Subject to any disclaimer, the term of this patent is extended or adjusted under 35 U.S.C. 154(b) by 251 days.

(21) Appl. No.: 18/253,931

(22) PCT Filed: Nov. 16, 2021

(86) PCT No.: PCT/EP2021/081849
§ 371 (c)(1),
(2) Date: May 23, 2023

(87) PCT Pub. No.: WO2022/112058
PCT Pub. Date: Jun. 2, 2022

(65) Prior Publication Data
US 2024/0091558 A1   Mar. 21, 2024

(30) Foreign Application Priority Data
Nov. 27, 2020   (EP) .................................... 20210475

(51) Int. Cl.
*A61N 5/10* (2006.01)
*G16H 20/40* (2018.01)

(52) U.S. Cl.
CPC .......... *A61N 5/1031* (2013.01); *A61N 5/1043* (2013.01); *G16H 20/40* (2018.01); *A61N 2005/1034* (2013.01)

(58) Field of Classification Search
CPC ........ A61N 5/10; A61N 5/103; A61N 5/1031; A61N 5/1043; A61N 2005/1034; G16H 20/40
See application file for complete search history.

(56) References Cited

U.S. PATENT DOCUMENTS 11,957,934 B2 *   4/2024   Hirvonen ............... G16H 50/50

FOREIGN PATENT DOCUMENTS

| EP | 3881895 A1 | 3/2020 |
| JP | 2019507657 A | 3/2019 |
| JP | 2019146964 A | 9/2019 |
| WO | 2017081826 A1 | 5/2017 |
| WO | 2020185544 A1 | 9/2020 |

OTHER PUBLICATIONS

Vozenin et al., The advantage of Flash radiotherapy confirmed in mini-pig and cat-cancer patients. Clinical Cancer Research, American Association for Cancer Research, 2019.
International Search Report & Written Opinion, European Patent Office, Feb. 4, 2022, Rijswijk, Netherlands.
Office Action dated Jun. 17, 2025 in corresponding Japanese application No. 2023-531114, Japan Patent Office, Tokyo, Japan.

* cited by examiner

*Primary Examiner* — Jurie Yun
(74) *Attorney, Agent, or Firm* — Noréns Patentbyrå Ab

(57) ABSTRACT

A radiotherapy treatment planning method for achieving a FLASH radiotherapy treatment plan involves optimizing the plan using an optimization problem that has been designed to maximize the part of the irradiation that will be delivered under FLASH conditions, in particular to an organ at risk, to minimize the damage to the organ at risk.

12 Claims, 2 Drawing Sheets

Dose rate at (iX=43  iY=43  iZ=21)  (X=3.0317  Y=5.03  Z=-3.7  DICOM voxel center)

Dose rate at (iX=43  iY=43  iZ=21)  (X=3.0317  Y=5.03  Z=-3.7  DICOM voxel center)

METHOD, COMPUTER PROGRAM PRODUCT AND COMPUTER SYSTEM FOR RADIOTHERAPY PLANNING, AND RADIOTHERAPY DELIVERY SYSTEM

TECHNICAL FIELD

The present invention relates to radiotherapy planning and in particular to a method for radiotherapy treatment planning for generating treatment plans involving irradiation under FLASH conditions, a computer program and a computer system for performing such planning and a radiotherapy delivery system for delivering such treatment to a patient.

BACKGROUND

When administering radiotherapy treatment to a target, there will always be some dose delivered outside of the target, to healthy tissue or organs at risk, and therefore there is always a risk that healthy organs or tissue are damaged by the radiation. One emerging treatment method that appears to cause less undesired damage is FLASH therapy, which involves treatment at a much higher dose rate than conventional therapy, for example, 70 Gy/s. In the literature related to FLASH, various lower limits to the dose rates are suggested, such as at least 40 Gy/s or 50 Gy/s. If, for example, a dose of 20 Gy is to be delivered with a dose rate of 70 Gy/s, the whole dose will be delivered in 0.29 s. In contrast, conventional radiotherapy treatment is delivered at much lower dose rates, a typical dose rate for conventional radiotherapy treatment being a few Gy per minute. It has been found that with FLASH therapy the damage done to healthy tissue by a particular dose is lower than with conventional therapy, while the effect on the target, that is, the tumorous tissue response, remains the same, although the mechanisms behind this are not yet fully understood. In FLASH therapy, the radiation dose of an entire therapy session may be delivered as one ultra-high dose in less than a second by either a single broad beam, or by a number of pencil beams having a high dose rate and being delivered as spots with short time intervals between them as the beam moves from side to side scanning the target in horizontal lines.

Vozenin et al.: The advantage of FLASH radiotherapy confirmed in mini-pig and cat-cancer patients, HAL Id: hal-01812514, https://hal-univ-rennesl.archives-ouvertes.fr/hal-01812514v2 confirmed that the differential effect between normal tissue and tumor subjected to FLASH therapy, that had previously been shown for mice, could also be seen in pigs and cats.

Dose delivered under FLASH conditions to risk organs causes less damage by a factor which may be approximately 30%. Hence, the iso-effective harmful dose to an organ at risk is higher than the physical dose, in this example, 1/0.7 times the physical dose.

Co-pending patent application EP20163840.0 discloses a method of planning FLASH therapy arranged to compensate for the fact that when delivering FLASH therapy to a patient, because of the nature of the dose delivery, a portion of the irradiation dose will be delivered to each voxel at a lower non-FLASH dose rate. The method includes defining a desired dose distribution including a target dose prescription, and optimizing the plan using an optimization problem designed to minimizing the dose to at least one organ at risk while maximizing the FLASH portion of the dose to at least one organ at risk while respecting the target dose prescription.

SUMMARY OF THE INVENTION

It is an object of the invention to provide FLASH therapy that further increases the FLASH effect of a pencil beam scanning therapy.

The invention relates to a computer-based method of creating a radiation therapy treatment plan for a patient, said plan involving FLASH therapy provided as at least a first beam such that a portion of the irradiation will be delivered as FLASH irradiation, said method comprising defining a desired dose distribution including a target dose prescription, and optimizing the plan using an optimization problem designed in such a way that the plan will include delivery of spots in a pattern designed to deliver clusters of adjacent spots consecutively. The pattern includes both the positions of the spots and the order in which the spots are to be irradiated.

The invention is based on the insight that the time structure of the dose delivery is important for achieving the effect of FLASH therapy and that a voxel will receive dose delivered to adjacent spots. If these spots are delivered with very short time intervals between them, the FLASH effect will be enhanced. Conventional pencil beam scanning is performed line by line. In that way, by the time the adjacent spot in the line below is delivered, there will be less or no synergy between the spots. By grouping spots together in sub-areas of the target so that the pencil beam will deliver dose consecutively to a cluster of spots located in the same sub-area, the FLASH effect can be maintained in volumes irradiated by spots in the same cluster.

In other words, for voxels downstream of a spot cluster the dose delivery will be concentrated to a shorter period of time which will enhance the FLASH effect in such voxels. This will not affect the plan quality at all, as the same spots and weights are delivered.

The clusters may be arranged to have the same shape and size, or the clusters may be allowed to vary in at least one of shape and size. A hexagonal shape of the clusters is often advantageous but any shape or set of shapes may be defined to cover the target in the best suitable way.

In some embodiments, the optimization problem includes a penalty function arranged to penalize a spot delivery order giving low FLASH effect. This means that the optimization problem will include a function designed to favor the irradiation of adjacent spots consecutively, since the FLASH effect in each voxel is enhanced by the radiation provided to the voxel from a number spots within a period of time that is short enough.

In preferred embodiments employing proton radiation, the optimization problem is defined to optimize with respect to relative biological effectiveness (RBE) dose. RBE is a measure of the damage caused by a particular dose relative to a reference dose, which is different for different types of radiation, and for FLASH and non-FLASH respectively. For photons under non-FLASH conditions the RBE is 1. For non-FLASH proton therapy current clinical practice is to us a factor 1.1, which means that 70 Gy delivered as non-FLASH proton radiation corresponds to 77 Gy delivered as non-FLASH photon radiation.

In some embodiments, the optimization problem comprises an objective function designed to maximize the FLASH portion of the plan. Alternatively, the optimization problem comprises an objective function designed to minimize the non-FLASH portion of the plan. As will be understood, this is just two different ways of expressing the same objective, since the total dose will be the sum of the FLASH portion and the non-FLASH portion.

As in the aforementioned co-pending application, the optimization problem may be designed to maximize the FLASH portion or minimize the non-FLASH portion, as the case may be, by optimizing or selecting one or more of the following:

spot size,
spot shape
spot placement
spot weights
beam arrangement with respect to energy, number of beams and/or direction of beams Alternatively, or in addition, the optimization problem may be defined so as to maximize the FLASH portion or minimize the non-FLASH portion by optimizing or selecting by optimizing or selecting an order for scanning the spots.

It is possible to optimize a plan having at least a first and a second beam, both beams including FLASH portions. These may be delivered by a rotating gantry, or by two radiation sources positioned at an angle from each other. In the latter case, the two beams may be delivered with a very short interval between them, so as to enhance the FLASH effect.

It is also possible to optimize a plan including at least a first and a second beam, wherein the first beam includes a FLASH portion and the second beam only includes a conventional non-FLASH irradiation. In this case, the optimization problem is preferably arranged to minimize the total effective dose from both the FLASH therapy portion and the conventional therapy portion of the first beam and the second beam in at least one organ at risk.

The invention also relates to a computer program product comprising computer-readable code which, when run in a processor in a computer will cause the processor to perform the method according to any one of the embodiments discussed above. The computer program product may include non-transitory storage means having the code stored thereon. The invention also relates to a computer system comprising a processor, at least one data memory and a program memory, wherein the program memory comprises such a computer program product.

The invention also relates to a system for delivering radiotherapy treatment to a patient, comprising a radiation source. The radiation source may be arranged in any suitable way, for example in a gantry or realized by a fixed beam line, wherein the radiation source is arranged to provide radiation at a dose rate high enough to provide FLASH treatment to the patient, said system further comprising a computer for controlling the system, the computer comprising a processor and a memory comprising a treatment plan obtained through an embodiment of the method discussed above.

BRIEF DESCRIPTION OF DRAWINGS

The invention will be described in more detail in the following, by way of examples and with reference to the appended drawings.

DETAILED DESCRIPTION OF EMBODIMENTS

FLASH therapy may be delivered by pencil beam scanning, that is, as a number of beams having a high dose rate and being delivered with short time intervals between them. Short in this context should be taken to mean much shorter than the normal time required for rotating a gantry from one beam angle to another, which is normally around 30 seconds. A high dose rate in this context is assumed to be above 40 Gy/s but may be considerably higher. This means that the delivery time for a certain dose with FLASH therapy will be considerably lower than with conventional therapy. For example, in conventional therapy, a dose of 2 Gy may be delivered as continuous radiation over a period of approximately one minute, whereas a FLASH dose of 2 Gy will be delivered in the fraction of a second, 1/20 of a second if the dose rate is 40 Gy/s. Since FLASH therapy means that the effective dose to the target is close to the physical dose while the effective dose to the surrounding healthy tissue is lower by a factor of maybe 30%, such therapy is advantageous in that it reduces the damage to healthy tissue. The time frame for FLASH dose delivery should be somewhere on the order of magnitude between millisecond and second.

Figure 2:
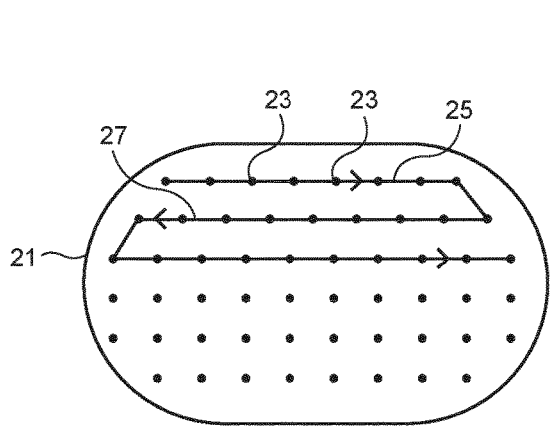
FIG. 2 illustrates the order of spot delivery in conventional pencil beam scanning.

The treatment plan will be discussed here based on a single energy layer per beam, and assuming that the spots in the energy layer are placed in a hexagonal pattern and are delivered line by line as shown in FIG. 2. To reach the FLASH effect the dose delivered to a voxel should be delivered as fast as possible. Estimates exemplify that dose should be delivered within 10 ms to 100 ms with a prompt dose rate exceeding 100 Gy/s.

Figure 1:
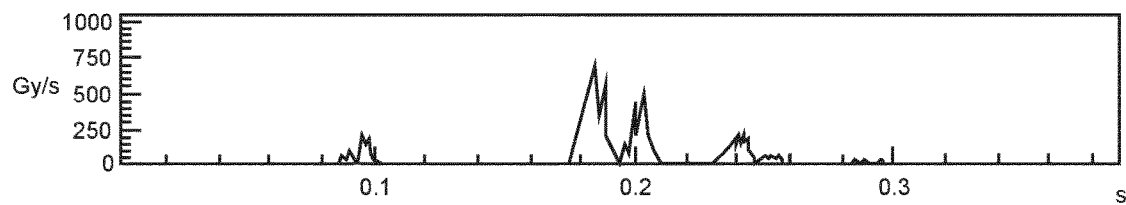
FIG. 1 illustrates by way of example the time structure of dose delivery by pencil beam scanning.

FIG. 1 illustrates, by way of example, the time structure for a FLASH irradiation of one individual voxel in the patient, for example a voxel within the organ at risk, as the dose rate (cGy/s) per time unit. The irradiation is delivered as a pencil beam scan, which means that part of the delivery will only partially irradiate the voxel when the pencil beam central axis passes the voxel by a distance, whereas other parts will hit close to the center of the voxel. The ones that only partially hit the voxel will result in a lower dose rate, and therefore a lower dose, to the voxel, typically a non-FLASH level whereas the ones that hit close to the center of the voxel will have a higher dose rate for the voxel and therefore give a higher dose, which will constitute the FLASH component. In the example shown in FIG. 1, there is first a non-flash component at 0.1 s, then two higher peaks, with a sufficiently high dose rate to constitute FLASH irradiation, in this example momentarily reaching up to about 7000 Gy/s, between 0.18 and 0.2 s and finally a lower, non-FLASH component at around 0.22 s. As will be understood, there may be more, or fewer of both FLASH and non-FLASH components, but in practice there will always be at least one of each. A similar time structure for a conventional non-FLASH dose delivery would be a substantially continuous irradiation at, for example, 2Gy, for a longer period of time, for example one minute.

In the general case, the Total Effective Dose TED for an organ at risk may be expressed in terms of the following equation:

$$TED = x*D(\text{non-FLASH}) + y*D(\text{FLASH})$$

where D(non-FLASH) is the physical non-FLASH dose component to the voxel and D(FLASH) is the physical FLASH dose component. x and y are factors modelling the RBE for the respective component. This means that x and y express the total effective dose from the non-FLASH component and the FLASH component, respectively, relative to the physical dose of that component. A typical value for y is 0.7. For photons, x=1. for charged particles, x is somewhat higher than 1, for example 1.1 for protons.

According to the invention, therefore, the FLASH therapy treatment is planned by means of optimization of an optimization problem designed to provide the desired dose to the target with a high dose rate as discussed above, in a short period of time, typically less than 1 s, while keeping the total effective dose to the surrounding tissue at an acceptable level for healthy tissue, including any organs at risk. This is done, in part, by utilizing the fact that the total effective dose from the FLASH component is lower than the total effective dose from the non-FLASH component, relative to the respective actual dose component. The dose may be delivered as one beam or as a number of beams. To achieve this, the optimization problem includes an objective function designed to select the spot order so as to maximize the FLASH component in at least one organ at risk. As will be understood, this may also be formulated as minimizing the non-FLASH component in the at least one organ at risk. To this end, the optimization problem may include a penalty function arranged to penalize a spot delivery order giving low FLASH effect. As explained above, each voxel may be affected by several adjacent spots. When these spots are close in time, the accumulated radiation from several spots may lead to a FLASH effect. As is common in the art, this objective may be achieved by in different ways, including optimizing one or more of the following:

the spot scan order, and/or
the spot placement and/or
the spot weights and/or
the beam arrangement, with respect to the energy, directions and/or number of beams.
the spot shape FIG. 2 illustrates the pattern of conventional pencil beam scanning A target 21 is covered by spots 23 by a beam moving horizontally left to right along a first row, as indicated by an arrow 25 then right to left along a second row just below the first row as indicated by an arrow 27, then left to right along a third row, etc., delivering spots along the row. Each voxel will typically be affected by spots from a number of rows, for example 5 rows. For FLASH therapy, as explained above, the dose rate is much higher than for conventional therapy, for example 100 Gy/s or higher. Delivery of one line may typically take between 5 and 50 ms. As will be understood, for any given spot, the time until the adjacent spot in the next line is delivered can be up to twice that time, which means that for most spots the time interval will be too long to achieve or enhance the FLASH effect, in particular or spots being more than one line apart.

Figure 3A:
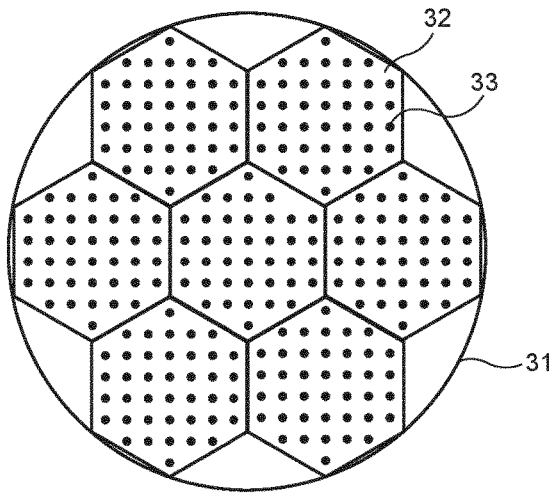
FIGS. 3a and 3b illustrate different ways of dividing the spots into clusters for FLASH therapy according to embodiments of the invention.
Figure 3B:
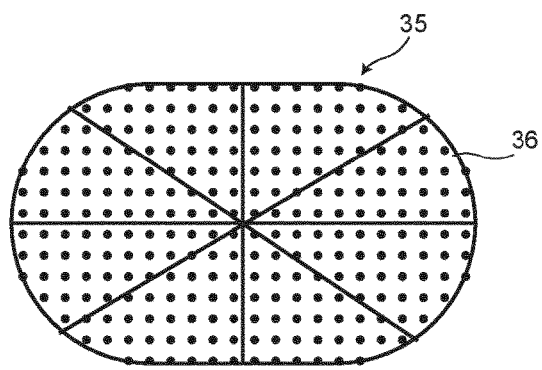

FIGS. 3a and 3b illustrate different ways of dividing the spots into clusters for FLASH therapy according to embodiments of the invention. In FIG. 3a, an area 31 comprising the target is divided into a honeycomb pattern, comprising a number of hexagons 32. Spots 33 will be delivered consecutively within each hexagon to ensure that each voxel receives the dose from each spot that contributes dose to this voxel within as short time as possible. Within each hexagon, the spots may be delivered in any suitable pattern, for example in a spiral pattern starting from the center of the hexagon and moving outwards, or in the opposite direction. Each hexagon may also be divided into smaller subportions, each comprising a matrix of 4, 9 or 16 adjacent spots, or any other suitable number, that will be irradiated consecutively.

In another example, as shown in FIG. 3b, the target 35 is divided into parts 36 like a pie by lines that intersect approximately in the center of the target and spots 33 will be delivered consecutively within each part to ensure that each voxel receives the dose from each spot that contributes dose to this voxel within as short time as possible. Within each part 36, the spots may be delivered in any suitable pattern including line by line or in smaller groups of for example 4 or 9, or any suitable number of adjacent spots forming a matrix.

As will be understood, any suitable shape depending on factors such as the overall shape of the target, may be used. Also, the parts do not need to have the same size and/or shape but may be selected freely to match the target in the best possible way. For voxels falling at cluster boundaries the FLASH effect will be reduced. This can be mitigated by either removing such spots while letting the optimizer try to compensate for this as much as possible. Alternatively, such boundary spots can be kept but forced to have a e.g. 30% lower weight in the solution to smooth the FLASH effectiveness corrected dose.

The areas defining each cluster of spots may be preset in the system according to a pattern that is generally found to provide good synergy between the spots. Alternatively, the areas may be defined for each patient or target individually, to suit the particular shape and structure of the target. In both cases, the pattern is input into the optimization problem as a constraint.

It would also be possible to let the division into cluster, and/or the delivery order of the spots be handled in the optimization process. This could be achieved by means of an optimization problem modeled on the "traveling salesman" problem with a cost function based on delivery order modelled FLASH effect.

Figure 4:
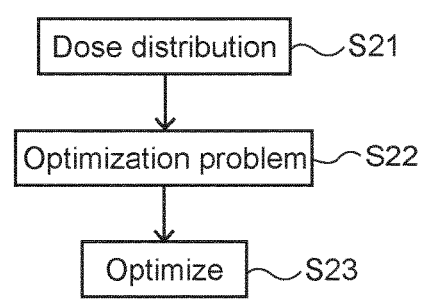
FIG. 4 is a flow chart of a method according to an embodiment of the invention.

FIG. 4 is a schematic flow chart of the method of optimizing a pencil beam treatment plan according to embodiments of the invention. In a first step S21, the desired dose distribution for a particular patient is defined. In a second step S22, an optimization problem is defined. In a third step S23, dose optimization is performed based on the optimization problem.

The optimization problem is preferably designed to output a plan for FLASH therapy only. The FLASH therapy may be delivered in one or more beams from the same or different angles. As indicated above, the optimization problem includes one or more optimization functions designed to group the spots into clusters As discussed above, the optimization problem is preferably designed such that the FLASH effect is maximized while respecting the target dose prescription. According to the invention, the FLASH effect is enhanced by delivering spots that are close to each other within a short enough time interval to achieve an accumulated FLASH dose. For proton irradiation this means that the optimization problem may be designed to also consider the Relative Biological Effectiveness (RBE) of the dose, which for FLASH therapy is a function of both the dose rate and the time structure of the radiation, as well as other factors such as tissue type and type of irradiation. Other factors may also be considered. The time frame for dose delivery should be somewhere on the order of magnitude between millisecond and second.

The aim of the treatment plan optimization is to achieve the desired dose in the target while minimizing the total effective dose in at least one organ at risk, where the total effective dose is the sum of the FLASH dose component, adjusted for the FLASH effect factor, and the conventional therapy component of the treatment. One way of implementing this would be to use different types of scorers in the dose engine. For example, in a Monte Carlo dose engine this would involve scoring one or more of:

voxel-wise energy deposition time traces resolved into time bins of for example approximately milliseconds.

dirty dose concept, where dirty in this context can mean non-FLASH dose in the organ at risk.

A Monte Carlo simulation follows the path of different particles, including the direction and energy of the particle, the type of particle and the physical effect of the particle. The skilled person would be able to implement this in other types of dose engine.

Figure 5A:
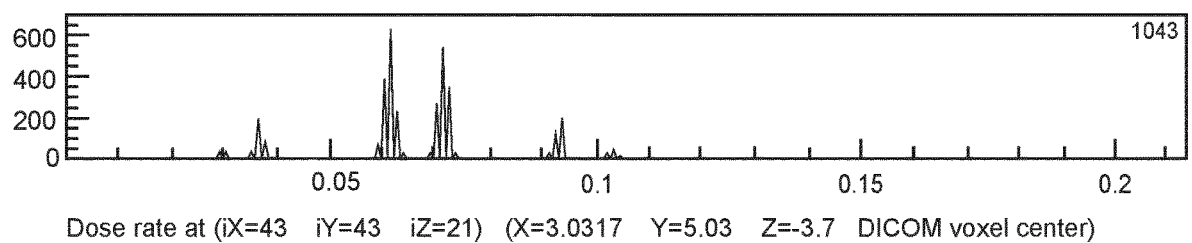
FIGS. 5a and 5b illustrate by way of example the effect of delivering the spots in lines and clusters, respectively.
Figure 5B:
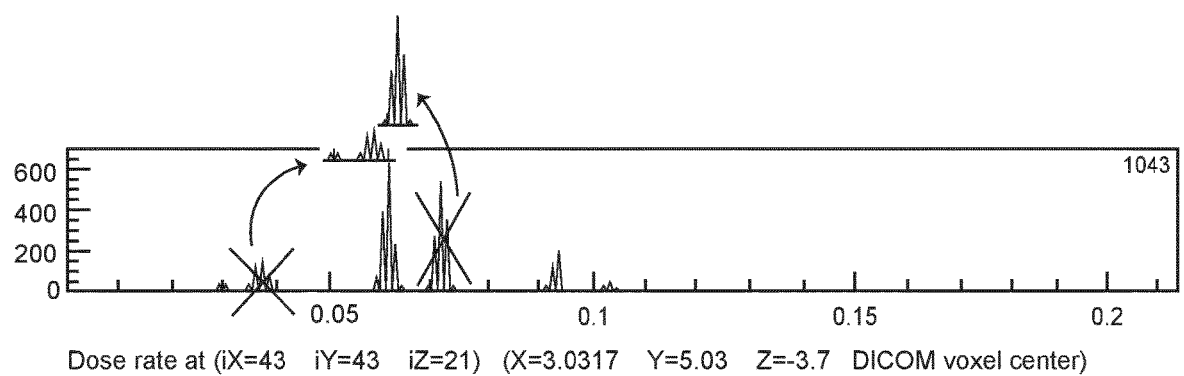

FIGS. 5a and 5b illustrate by way of example the effect of delivering the spots in lines and clusters, respectively. In FIG. 5a, as in FIG. 1, the dose to a voxel is shown as a function of time. In FIG. 5a spots are delivered in the beams conventionally used in pencil beam scanning. As can be seen, some of the spots affecting the voxel are delivered at the time intervals of up to approximately 50 ms, which is too long for the effect spots to be accumulated to achieve FLASH therapy. In particular, there is a first spot just before 0.04 s, two spots at about 0.06 s and 0.07 s and a fourth spot at about 0.09 s. The relatively long time intervals are caused by the spots belonging to different lines, or rows in the conventional pattern shown in FIG. 2. In FIG. 5b, the spot delivery order has been changed so that the first and fourth spots are instead delivered closer in time to the second and third spots, and the dose of all these four spots will accumulate and enhance the FLASH effect.

Figure 6:
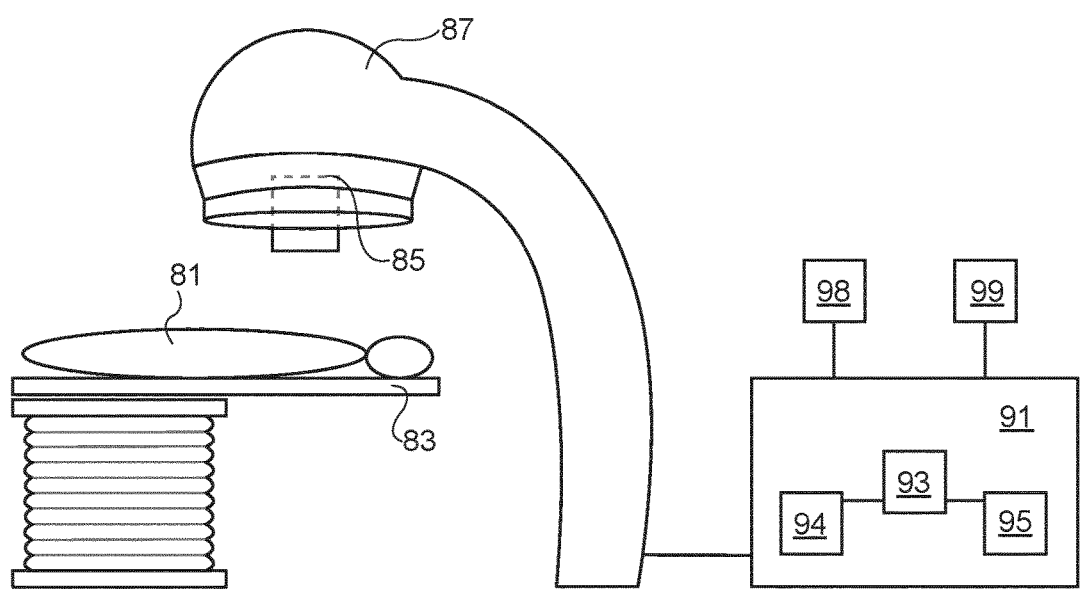
FIG. 6 is an overview of a system 80 for radiotherapy treatment and/or treatment planning.

FIG. 6 is an overview of a system 80 for radiotherapy treatment and/or treatment planning. As will be understood, such systems may be designed in any suitable way and the design shown in FIG. 4 is only an example. A patient 81 is positioned on a treatment couch 83. The system comprises an imaging/treatment unit having a radiation source 85 mounted in a gantry 87 for emitting radiation towards the patient positioned on the couch 83. Typically, the couch 83 and the gantry 87 are movable in several dimensions relative to each other, to provide radiation to the patient 81 as flexibly and correctly as possible. These parts and their functions are well known to the skilled person. A main difference between the system used in the context of the invention and a conventional radiotherapy delivery system is that the system according to the invention is adapted to deliver much higher dose rates that what is done according to conventional radiotherapy. Suitable magnitudes of the dose rate are discussed above.

A number of passive devices provided to shape the beam laterally and in depth are typically present and will not be discussed in more detail here. Means are arranged for providing a grid of beams, for example in the form of a grid block, or means for providing pencil beams. The system also comprises a computer 91 which may be used for radiotherapy treatment planning and/or for controlling radiotherapy treatment. As will be understood, the computer 91 may be a separate unit not connected to the imaging/treatment unit.

The computer 91 comprises a processor 93, a data memory 94, and a program memory 95. Preferably, one or more user input means 98, 99 are also present, in the form of a keyboard, a mouse, a joystick, voice recognition means or any other available user input means. The user input means may also be arranged to receive data from an external memory unit.

The data memory 94 comprises clinical data and/or other information used to obtain a treatment plan, or related to the plan itself. Typically, the data memory 94 comprises one or more patient images to be used in treatment planning according to embodiments of the invention. The program memory 95 holds at least one computer program arranged to cause the processor to control the delivery system according to the optimized treatment plan.

As will be understood, the data memory 94 and the program memory 95 are shown and discussed only schematically. There may be several data memory units, each holding one or more different types of data, or one data memory holding all data in a suitably structured way, and the same holds for the program memories. One or more memories may also be stored on other computers. Both the program and the data can be found in one or more memories within the computer system or in another unit that is accessible from the computer system.

The invention claimed is:

1. A computer-based method of creating a radiation therapy treatment plan for a patient, the plan involving FLASH therapy provided as at least a first beam such that a portion of the irradiation will be delivered as FLASH irradiation, comprising:

defining a desired dose distribution including a target dose prescription; and optimizing the plan using an optimization problem designed in such a way that the plan will include delivery of spots in a pattern designed to deliver clusters of adjacent spots consecutively, wherein the optimization problem includes a penalty function arranged to penalize a spot delivery order giving low FLASH effect.

2. The method of claim 1, wherein the clusters are defined to have the same shape and size.

3. The method of claim 1, wherein the clusters are defined to differ in at least one of shape and size.

4. The method of claim 1, wherein at least one cluster is defined to have a hexagonal shape.

5. The method of claim 1, wherein the optimization problem is defined to optimize with respect to relative biological effectiveness dose.

6. The method of claim 1, wherein the optimization problem is defined to further enhance the FLASH effect by optimizing or selecting at least one of:

the spot weights and/or the beam arrangement with respect to energy, number of beams and/or directions of beams.

7. The method of claim 1, wherein the optimization problem is defined to maximize a FLASH component or minimize a non-FLASH component by optimizing or selecting an order for scanning the spots.

8. The method of claim 1, wherein the plan includes at least a first and a second beam, each of the first and second beams being delivered as FLASH irradiation.

9. The method of claim 1, wherein the plan involves a first beam including a FLASH therapy portion and a second beam including only conventional therapy, the optimization problem being arranged to minimize the total effective dose from both the FLASH therapy portion and the conventional therapy portion of the first beam and the second beam in at least one organ at risk.

10. A non-transitory computer program product comprising computer-readable code which, when run in a processor in a computer will cause the processor to perform the steps of claim 1.

11. A computer system comprising a processor, at least one data memory and a program memory, wherein the program memory comprises a computer program product according to claim 10.

12. A system for delivering radiotherapy treatment to a patient, comprising:
   a radiation source in a gantry, wherein the radiation source is arranged to provide radiation at a dose rate high enough to provide FLASH treatment to the patient; and
   a computer for controlling the system, the computer comprising a processor and a memory comprising a treatment plan obtained through the method of claim 1.

* * * * *